US010227846B2

(12) United States Patent
Monroe et al.

(10) Patent No.: US 10,227,846 B2
(45) Date of Patent: *Mar. 12, 2019

(54) METHOD OF INHIBITING FOULING ON A METALLIC SURFACE USING A SURFACE MODIFYING TREATMENT AGENT

(71) Applicant: Baker Hughes Incorporated, Houston, TX (US)

(72) Inventors: Terry D. Monroe, Tomball, TX (US); Naima Bestaoui-Spurr, The Woodlands, TX (US); Sumit Bhaduri, The Woodlands, TX (US); Qi Qu, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 1125 days.

This patent is subject to a terminal disclaimer.

(21) Appl. No.: 14/491,951

(22) Filed: Sep. 19, 2014

(65) Prior Publication Data

US 2015/0083397 A1 Mar. 26, 2015

Related U.S. Application Data

(60) Provisional application No. 61/880,833, filed on Sep. 20, 2013, provisional application No. 61/880,835, filed on Sep. 20, 2013.

(51) Int. Cl.
*E21B 41/02* (2006.01)
*F16L 58/10* (2006.01)
*F16L 58/04* (2006.01)
*C09K 8/524* (2006.01)
*C09K 8/54* (2006.01)
*C09K 8/60* (2006.01)
*C09D 183/04* (2006.01)
*C09K 8/528* (2006.01)
*C09D 183/16* (2006.01)
*C08G 77/62* (2006.01)

(52) U.S. Cl.
CPC ............ *E21B 41/02* (2013.01); *C09D 183/04* (2013.01); *C09D 183/16* (2013.01); *C09K 8/524* (2013.01); *C09K 8/528* (2013.01); *C09K 8/54* (2013.01); *C09K 8/605* (2013.01); *F16L 58/1009* (2013.01); *C08G 77/62* (2013.01); *F16L 58/04* (2013.01)

(58) Field of Classification Search
None
See application file for complete search history.

(56) References Cited

U.S. PATENT DOCUMENTS

| | | |
|---|---|---|
| 3,285,339 A | 11/1966 | Walther et al. |
| 3,593,796 A | 7/1971 | Stainback et al. |
| 4,042,032 A | 8/1977 | Anderson et al. |
| 4,074,536 A | 2/1978 | Young |
| 4,231,428 A | 11/1980 | Needham et al. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,460,483 A | 7/1984 | Weaver |
| 4,462,718 A | 7/1984 | McLaughlin et al. |
| 4,498,538 A | 2/1985 | Watkins et al. |
| 4,536,304 A | 8/1985 | Borchardt |
| 4,536,305 A | 8/1985 | Borchardt et al. |
| 4,580,633 A | 4/1986 | Watkins et al. |
| 4,585,064 A | 4/1986 | Graham et al. |
| 4,646,835 A | 3/1987 | Watkins et al. |
| 4,787,453 A | 11/1988 | Hewgill et al. |
| 5,291,949 A | 3/1994 | Dovan et al. |
| 5,406,085 A | 4/1995 | Sharma |
| 5,501,274 A | 3/1996 | Nguyen et al. |
| 5,582,249 A | 12/1996 | Caveny et al. |
| 5,730,922 A | 3/1998 | Babb et al. |
| 5,735,349 A | 4/1998 | Dawson et al. |
| 5,775,425 A | 7/1998 | Weaver et al. |
| 5,787,986 A | 8/1998 | Weaver et al. |
| 5,839,510 A | 11/1998 | Weaver et al. |
| 5,853,048 A | 12/1998 | Weaver et al. |
| 5,853,049 A | 12/1998 | Keller |
| 5,871,049 A | 2/1999 | Weaver et al. |
| 5,883,300 A | 3/1999 | Johnson |
| 5,921,317 A | 7/1999 | Dewprashad et al. |
| 5,958,578 A | 9/1999 | Blohowiak et al. |
| 6,047,772 A | 4/2000 | Weaver et al. |
| 6,059,034 A | 5/2000 | Rickards et al. |
| 6,066,403 A | 5/2000 | Sherwood et al. |
| 6,146,767 A | 11/2000 | Schwartz |
| 6,209,643 B1 | 4/2001 | Nguyen et al. |
| 6,330,916 B1 | 12/2001 | Rickards et al. |
| 6,364,018 B1 | 4/2002 | Brannon et al. |
| 6,521,334 B1 | 2/2003 | Ogawa et al. |
| 6,586,483 B2 | 7/2003 | Kolb et al. |
| 6,593,000 B2 | 7/2003 | Ohtake et al. |
| 6,683,309 B2 | 1/2004 | Sharma |
| 6,689,854 B2 | 2/2004 | Fan et al. |
| 6,749,025 B1 | 6/2004 | Brannon et al. |
| 6,772,838 B2 | 8/2004 | Dawson et al. |
| 7,040,403 B2 | 5/2006 | Nguyen et al. |
| 7,063,150 B2 | 6/2006 | Slabaugh et al. |
| 7,063,151 B2 | 6/2006 | Nguyen et al. |

(Continued)

FOREIGN PATENT DOCUMENTS

| | | |
|---|---|---|
| CN | 103013467 A | 4/2013 |
| EP | 2 433 999 A1 | 3/2012 |

(Continued)

OTHER PUBLICATIONS

Aculon Inc; "Aculon AL-B"; Material Data Sheet; Dec. 2012; 1 page; Aculon, Inc.; San Diego, California.

(Continued)

*Primary Examiner* — John J Figueroa
(74) *Attorney, Agent, or Firm* — John Wilson Jones; Jones Delflache LLP

(57) ABSTRACT

Fouling caused by contaminants onto a metallic tubular, flow conduit or vessel in an underground reservoir or extending from or to an underground reservoir may be inhibited by applying onto the surface of the metallic tubular, flow conduit or vessel a treatment agent comprising a hydrophobic tail and an anchor. The anchor attaches the treatment agent onto the surface of the metallic tubular, flow conduit or vessel.

28 Claims, No Drawings

(56) References Cited

U.S. PATENT DOCUMENTS

| | | | |
|---|---|---|---|
| 7,163,060 B2 | 1/2007 | Weiss et al. |
| 7,166,851 B2 | 1/2007 | Sharma |
| 7,198,681 B2 | 4/2007 | Nguyen et al. |
| 7,204,311 B2 | 4/2007 | Welton et al. |
| 7,252,146 B2 | 8/2007 | Slabaugh et al. |
| 7,258,170 B2 | 8/2007 | Nguyen et al. |
| 7,261,156 B2 | 8/2007 | Nguyen et al. |
| 7,264,051 B2 | 9/2007 | Nguyen et al. |
| 7,281,150 B1 | 10/2007 | Strickland |
| 7,281,580 B2 | 10/2007 | Parker et al. |
| 7,281,581 B2 | 10/2007 | Nguyen et al. |
| 7,299,869 B2 | 11/2007 | Kalman |
| 7,314,850 B2 | 1/2008 | Taylor et al. |
| 7,325,608 B2 | 2/2008 | van Batenburg et al. |
| 7,328,744 B2 | 2/2008 | Taylor et al. |
| 7,343,972 B2 | 3/2008 | Willingham et al. |
| 7,350,571 B2 | 4/2008 | Nguyen et al. |
| 7,361,724 B2 | 4/2008 | Guire et al. |
| 7,397,072 B2 | 7/2008 | Dodabalapur et al. |
| 7,424,911 B2 | 9/2008 | McCarthy et al. |
| 7,426,961 B2 | 9/2008 | Stephenson et al. |
| 7,452,417 B2 | 11/2008 | Matula et al. |
| 7,459,209 B2 | 12/2008 | Smith et al. |
| 7,461,697 B2 | 12/2008 | Todd et al. |
| 7,500,519 B2 | 3/2009 | Weaver et al. |
| 7,534,745 B2 | 5/2009 | Taylor et al. |
| 7,538,538 B2 | 5/2009 | Dodabalapur et al. |
| 7,549,470 B2 | 6/2009 | Vinegar et al. |
| 7,550,413 B2 | 6/2009 | Huang et al. |
| 7,566,686 B2 * | 7/2009 | Kippie | C09K 8/12 507/110 |
| 7,571,767 B2 | 8/2009 | Parker et al. |
| 7,591,313 B2 | 9/2009 | Weaver et al. |
| 7,608,571 B2 | 10/2009 | Futterer et al. |
| 7,624,802 B2 | 12/2009 | McCrary et al. |
| 7,625,674 B2 | 12/2009 | Sharma et al. |
| 7,631,697 B2 | 12/2009 | Bhaysar |
| 7,691,478 B2 † | 4/2010 | Avaltroni |
| 7,691,789 B2 | 4/2010 | Fu et al. |
| 7,723,272 B2 | 5/2010 | Crews et al. |
| 7,730,948 B2 | 6/2010 | de Grood et al. |
| 7,740,940 B2 † | 6/2010 | Hanson |
| 7,772,162 B2 | 8/2010 | Pope et al. |
| 7,781,381 B2 | 8/2010 | Ke et al. |
| 7,825,269 B2 | 11/2010 | Mangelsdorf et al. |
| 7,845,409 B2 | 12/2010 | Shinbach et al. |
| 7,855,169 B2 | 12/2010 | Pope et al. |
| 7,858,561 B2 | 12/2010 | Abad et al. |
| 7,879,437 B2 † | 2/2011 | Hanson |
| 7,886,822 B2 | 2/2011 | Garcia-Lopez De Victoria et al. |
| 7,901,777 B2 | 3/2011 | Hanson |
| 7,921,911 B2 | 4/2011 | Fuller et al. |
| 7,931,087 B2 | 4/2011 | Gupta |
| 7,989,069 B2 † | 8/2011 | Bruner |
| 8,006,760 B2 | 8/2011 | Fleming et al. |
| 8,025,974 B2 † | 9/2011 | Hanson |
| 8,034,395 B2 | 10/2011 | Hofer et al. |
| 8,043,998 B2 | 10/2011 | Pope et al. |
| 8,047,288 B2 | 11/2011 | Skala et al. |
| 8,048,487 B2 | 11/2011 | Hanson |
| 8,056,630 B2 | 11/2011 | Huang et al. |
| 8,067,103 B2 | 11/2011 | Hanson |
| 8,084,401 B2 | 12/2011 | Lukocs et al. |
| 8,092,585 B2 | 1/2012 | Schwartz et al. |
| 8,138,127 B2 | 3/2012 | Pope et al. |
| 8,178,004 B2 | 5/2012 | Hanson |
| 8,178,476 B2 | 5/2012 | Xie et al. |
| 8,201,630 B2 | 6/2012 | Welton |
| 8,227,026 B2 | 7/2012 | McDaniel et al. |
| 8,236,426 B2 † | 8/2012 | Hanson |
| 8,261,825 B2 | 9/2012 | Pope et al. |
| 8,267,170 B2 | 9/2012 | Fowler et al. |
| 8,276,663 B2 | 10/2012 | Holtsclaw et al. |
| 8,276,664 B2 | 10/2012 | Gupta |
| 8,293,687 B2 | 10/2012 | Giffin |
| 8,337,985 B2 | 12/2012 | Hanson |
| 8,403,050 B2 | 3/2013 | Pope et al. |
| 8,418,759 B2 | 4/2013 | Moore et al. |
| 8,432,036 B2 | 4/2013 | Hanson et al. |
| 8,445,423 B2 | 5/2013 | Bruner et al. |
| 8,596,361 B2 | 12/2013 | Willberg et al. |
| 8,609,067 B2 | 12/2013 | Adams et al. |
| 8,629,089 B2 | 1/2014 | Dams |
| 8,678,090 B2 | 3/2014 | Baran, Jr. et al. |
| 8,701,763 B2 | 4/2014 | Baran, Jr. et al. |
| 8,741,658 B2 | 6/2014 | Boss et al. |
| 8,783,352 B2 | 7/2014 | Chenevert et al. |
| 8,794,322 B2 * | 8/2014 | Reyes | G01N 15/00 166/276 |
| 8,813,842 B2 | 8/2014 | Crandell et al. |
| 8,833,449 B2 | 9/2014 | Dams et al. |
| 8,989,847 B2 | 4/2015 | Adams et al. |
| 9,057,012 B2 | 6/2015 | Dams et al. |
| 9,200,102 B2 | 12/2015 | Baran, Jr. et al. |
| 9,226,731 B2 | 1/2016 | Liu et al. |
| 2002/0065358 A1 | 5/2002 | Carter et al. |
| 2003/0083448 A1 | 5/2003 | Fan et al. |
| 2004/0177957 A1 | 9/2004 | Kalfayan et al. |
| 2004/0186254 A1 | 9/2004 | Fan et al. |
| 2005/0244641 A1 | 11/2005 | Vincent |
| 2006/0065396 A1 | 3/2006 | Dawson et al. |
| 2006/0073393 A1 | 4/2006 | Sharma et al. |
| 2006/0272816 A1 | 12/2006 | Willberg et al. |
| 2007/0039632 A1 | 2/2007 | Dawson |
| 2007/0079965 A1 | 4/2007 | Nguyen et al. |
| 2007/0131422 A1 | 6/2007 | Gatlin et al. |
| 2007/0131425 A1 | 6/2007 | Gatlin et al. |
| 2007/0212700 A1 | 9/2007 | Ranganathan et al. |
| 2007/0219173 A1 | 9/2007 | Mangelsdorf et al. |
| 2008/0035340 A1 | 2/2008 | Welton et al. |
| 2008/0153720 A1 | 6/2008 | Huang et al. |
| 2008/0236842 A1 | 10/2008 | Bhavsar et al. |
| 2008/0257553 A1 | 10/2008 | Gatlin et al. |
| 2008/0278140 A1 | 11/2008 | Dodabalapur et al. |
| 2009/0011222 A1 | 1/2009 | Xiu et al. |
| 2009/0011248 A1 | 1/2009 | Hanson |
| 2009/0023618 A1 | 1/2009 | Futterer et al. |
| 2009/0062155 A1 | 3/2009 | Pope et al. |
| 2009/0114247 A1 | 5/2009 | Brown et al. |
| 2009/0203553 A1 | 8/2009 | Gatlin et al. |
| 2009/0275488 A1 | 11/2009 | Zamora et al. |
| 2009/0314549 A1 | 12/2009 | Chenevert et al. |
| 2009/0324834 A1 | 12/2009 | Hanson |
| 2010/0048429 A1 | 2/2010 | Dobson, Jr. et al. |
| 2010/0089578 A1 | 4/2010 | Nguyen et al. |
| 2010/0108379 A1 | 5/2010 | Edbury et al. |
| 2010/0130388 A1 * | 5/2010 | Phatak | C09K 8/08 507/215 |
| 2010/0137169 A1 | 6/2010 | Pope et al. |
| 2010/0167964 A1 | 7/2010 | Pope et al. |
| 2010/0167965 A1 | 7/2010 | Sebastian et al. |
| 2010/0181068 A1 | 7/2010 | Pope et al. |
| 2010/0212905 A1 | 8/2010 | van Petegem et al. |
| 2010/0224361 A1 | 9/2010 | Pope et al. |
| 2010/0263865 A1 | 10/2010 | Willberg et al. |
| 2010/0292108 A1 | 11/2010 | Kakadjian et al. |
| 2010/0292110 A1 | 11/2010 | Pope et al. |
| 2010/0319920 A1 | 12/2010 | Pope et al. |
| 2011/0005756 A1 | 1/2011 | Kakadjian et al. |
| 2011/0028443 A1 | 2/2011 | Mangelsdorf et al. |
| 2011/0083849 A1 | 4/2011 | Medvedev et al. |
| 2011/0136704 A1 | 6/2011 | Sharma et al. |
| 2011/0160104 A1 | 6/2011 | Wu et al. |
| 2011/0201531 A1 | 8/2011 | Sharma et al. |
| 2011/0223125 A1 | 9/2011 | Hough et al. |
| 2011/0247823 A1 | 10/2011 | Dams et al. |
| 2011/0259592 A1 | 10/2011 | Reyes |
| 2011/0275947 A1 | 12/2011 | Feldman et al. |
| 2011/0319759 A1 | 12/2011 | Liu et al. |
| 2012/0003481 A1 | 1/2012 | Hanson |
| 2012/0004388 A1 | 1/2012 | Hanson |
| 2012/0088699 A1 | 4/2012 | Qin |
| 2012/0097194 A1 | 4/2012 | McDaniel et al. |
| 2012/0145390 A1 | 6/2012 | Parse et al. |

(56) References Cited

U.S. PATENT DOCUMENTS

| | | |
|---|---|---|
| 2012/0241156 A1 | 9/2012 | Mulchopadhyay et al. |
| 2012/0251556 A1 | 10/2012 | Allison et al. |
| 2012/0279704 A1 | 11/2012 | Eoff et al. |
| 2012/0285689 A1 | 11/2012 | Weaver et al. |
| 2012/0285690 A1 | 11/2012 | Weaver et al. |
| 2012/0318514 A1 | 12/2012 | Mesher |
| 2012/0318515 A1 | 12/2012 | Cawiezel et al. |
| 2012/0325485 A1 | 12/2012 | Qu et al. |
| 2012/0329171 A1 | 12/2012 | Ismagliov et al. |
| 2013/0037161 A1 | 2/2013 | Hanson et al. |
| 2013/0284518 A1 | 10/2013 | Wu et al. |
| 2013/0331305 A1 | 12/2013 | Aswath et al. |
| 2014/0014586 A1 | 1/2014 | Soane et al. |
| 2014/0096967 A1 | 4/2014 | Sharma et al. |
| 2014/0121514 A1 | 5/2014 | Adams et al. |
| 2014/0162173 A1 | 6/2014 | Smith, Jr. et al. |
| 2014/0224492 A1 | 8/2014 | Weaver et al. |
| 2015/0083414 A1 | 3/2015 | Monroe et al. |
| 2015/0083415 A1 | 3/2015 | Monroe et al. |
| 2015/0083416 A1 | 3/2015 | Lant et al. |
| 2015/0083417 A1 | 3/2015 | Lant et al. |
| 2015/0299561 A1 | 10/2015 | Monroe et al. |
| 2016/0069174 A1 | 3/2016 | Cannan et al. |

FOREIGN PATENT DOCUMENTS

| | | |
|---|---|---|
| WO | 2006023143 A1 | 3/2006 |
| WO | 2006056774 A2 | 6/2006 |
| WO | 2006123143 A1 | 11/2006 |
| WO | 2008131540 A1 | 11/2008 |
| WO | 2010041033 A2 | 4/2010 |
| WO | 2010092095 A1 | 8/2010 |
| WO | 2010133175 A1 | 11/2010 |
| WO | 2011018604 A1 | 2/2011 |
| WO | 2012025805 A2 | 3/2012 |
| WO | 2012040025 A2 | 3/2012 |

OTHER PUBLICATIONS

Aculon Inc; "Aculon E"; Material Data Sheet; Jun. 2012; 1 page; Aculon, Inc.; San Diego, California.

Crews, Jim; "Amazon Shale Conductivity Service—A Proposed Multi-project Development"; Baker Hughes Inc.; Presentation, No. 1, 2013 PowerPoint.

Crews, Jim; "Amazon Shale Conductivity Service—A Proposed Multi-project Development"; Baker Hughes Inc.; Presentation, No. 2, 2013 PowerPoint.

Crews, Jim, "Amazon Shale Conductivity Service—A Proposed Multi-project Development", Baker Hughes Inc., Power Point Presentation, No. 1, 2013.

Crews, Jim, "Amazon Shale Conductivity Service—A Proposed Multi-project Development", Baker Hughes Inc., Power Point Presentation, No. 2, 2013.

Tak-Sing Wong, Taolei Sun, Lin Feng, Joanna Aizenberg; "Interfacial Materials With Special Wettability"; MRS Bulletin; May 2013; 6 pages; vol. 38; Materials Research Society; Warrendale, PA.

Ahmed M. Gomaa, Qi Qu, Russell Maharidge, Scott Nelson, Ted Reed; "New Insights into Hydraulic Fracturing of Shale Formations"; IPTC 17594; Jan. 2014; 6 pgs; International Petroleum Technology Conference; Richardson, Texas.

Ahmed M. Gomaa, Qi Qu, Russell Maharidge, Scott Nelson, ; "New Insights into Shale Fracturing Treatment Design"; SPE 167754; Feb. 2014; 15 pgs; Society of Petroleum Engineers; Richardson, Texas.

Jim Weaver, Philip Nhuyen, Stephen Ingram; "Sustaining Well Productivity"; SPE 102694; Jun. 2007; 6 pgs; Society of Petroleum Engineers; Richardson, Texas.

Jeff Hibbeler, Thomas Garcia, Dr. Nelson Chavez; "An Integrated Long-Term Solution for Migratrory Fines Damage"; SPE 81017; Apr. 2003; 11 pgs; Society of Petroleum Engineers; Richardson, Texas.

US Environmental Protection Agency; "Proceedings of the Technical Workshops for the Hydraulic Fracturing Study: Chemical & Analytical Methods"; EPA 600/R-11/066; May 2011; 122 pgs; Office of Research and Development, US Environmental Protection Agency; Washington DC.

T.W.Muecke; "Formation Fines and Factors Controlling Their Movement in Porous Media"; Journal of Petroleum Technology; Feb. 1979; 7 pgs; Exxon Production Research Co.

Philseok Kim, Tak-Sing Wong, Jack Alvarenga, Michael J. Kreder, Wilmer E. Adorno-Martinez, Joanna Aizenberg; "Liquid-Infused Nanostructed Surfaces with Extreme Anti-Ice and Anti-Frost Performance"; ACSNANO; Jun. 2012; 9 pgs; American Chemical Society; Cambridge, Massachusetts.

Aculon Inc; "Aculon AL-B"; Material Data Sheet; Jun. 2012; 1 pg; Aculon, Inc.; San Diego, California.

Aculon Inc; "Aculon E"; Material Data Sheet; Dec. 2012; 1 pg; Aculon, Inc.; San Diego, California.

Aculon Inc; "Aculon H1-F"; Material Data Sheet; Jun. 2011; 1 pg; Aculon, Inc.; San Diego, California.

TCI Europe NV; "Tetrakis" Safety Data Sheet; Nov. 2006; 4 pgs; TCI; Europe.

Mackenzie Company, LLC; "Metal Acetylacetonates"; Technical Data Sheet; 1 pg; MacKenzie Company, LLC; Bush, Louisiana.

Eric L. Bruner, SAMPS and Oleophobic Coating, 31, Nov. 14, 2012,NJ.†

\* cited by examiner
† cited by third party

METHOD OF INHIBITING FOULING ON A METALLIC SURFACE USING A SURFACE MODIFYING TREATMENT AGENT

This application claims the benefit of U.S. patent application Ser. No. 61/880,833 filed on Sep. 20, 2013 and U.S. patent application Ser. No. 61/880,835 filed on Sep. 20, 2013, both of which are herein incorporated in their entirety.

FIELD OF THE DISCLOSURE

The disclosure relates to a method of inhibiting fouling during production of fluids from an underground reservoir onto a metallic tubular, flow conduit or vessel by applying onto the surface of the metallic tubular, flow conduit or vessel a treatment agent having an anchor and a hydrophobic tail.

BACKGROUND OF THE DISCLOSURE

Fluids produced from underground reservoirs are generally complex mixtures of materials such as aliphatic hydrocarbons, aromatic hydrocarbons, hetero-atomic molecules, anionic and cationic salts, acids, sands, silts and clays. The nature of these fluids, combined with the severe conditions of heat, pressure, and turbulence to which they are often subjected, are contributory factors to the formation and deposition of contaminants, such as scales, salts, paraffins, corrosion, asphaltenes and bacteria in underground reservoirs. In particular, such contaminants are deposited onto equipment and flow conduits used in hydrocarbon producing wells and non-hydrocarbon producing wells.

Corrosion of metallic surfaces during such treatments is a prominent issue, as evidenced by surface pitting, embrittlement and loss of metal. For instance, in such well stimulation techniques as pickling, acid washing, matrix acidizing and acid fracturing, the acidic nature of the treatment fluid causes the production or workover conduits in the well to encounter considerable acidic corrosion.

Further, aqueous fluids, such as those used in drilling and completion, have a high salt content which cause corrosion. Gases, such as carbon dioxide and hydrogen sulfide, also generate highly acidic environments to which metallic surfaces become exposed. For instance, corrosion effects from brine and hydrogen sulfide are seen in flow lines during the processing of gas streams. The presence of methanol, often added to such streams to prevent the formation of undesirable hydrates, further often increases the corrosion tendencies of metallic surfaces.

Further, naturally occurring and synthetic gases are often conditioned by treatment with absorbing acidic gases, carbon dioxide, hydrogen sulfide and hydrogen cyanide. Degradation of the absorbent and acidic components as well as the generation of by-products (from reaction of the acidic components with the absorbent) results in corrosion of metallic surfaces.

The deposition of scales and asphaltenes further presents problems as they reduce well productivity and shorten the lifetime of production equipment. In order to clean such deposits from wells and equipment it is necessary to stop the production which is both time-consuming and costly.

It is fairly common during such oilfield treatment processes to use treatment agents to inhibit or prevent the formation of such contaminants. Many conventional inhibitors, however, are becoming unacceptable for use in oilfield treatment processes due to environmental protections measures which have been undertaken. Alternative solutions to address the inhibition of formation of such contaminants have been sought.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method of inhibiting fouling caused by contaminants onto a metallic tubular, flow conduit or vessel in an underground reservoir or extending from or to an underground reservoir is provided. The method comprises introducing onto a metal oxide on the metallic tubular, flow conduit or vessel a surface modifying treatment agent. The surface modifying treatment has a hydrophobic tail and an anchor for attaching the surface modifying treatment onto the metal oxide. The anchor of the surface modifying treatment attaches onto at least a portion of the metal oxide. Accumulation of contaminants onto the tubular, flow conduit or vessel is inhibited by exposing fluids capable of fouling such contaminants to the hydrophobic tail.

In another embodiment of the disclosure, a method of inhibiting fouling cused by contaminants onto a metallic tubular, flow conduit or vessel in an underground reservoir or extending from or to an underground reservoir is provided. The method comprises introducing onto a metal oxide on the metallic tubular, flow conduit or vessel a surface modifying treatment agent. The surface modifying treatment agent has an anchor and a hydrophobic tail. The anchor is an organophosphorus acid derivative. The hydrophobic tail is directed away from the metal oxide. The anchor attaches to at least a portion of the metal oxide. Fouling of contaminants from a fluid is inhibited onto the tubular, flow conduit or vessel by exposing the fluid to the hydrophobic tail.

In another embodiment of the disclosure, a method of inhibiting fouling of contaminants onto a metallic tubular, flow conduit or vessel used in an underground reservoir or extending from or to an underground reservoir is provided. The method comprises introducing onto a metal oxide on the metallic tubular, flow conduit or vessel a surface modifying treatment agent. The surface modifying treatment agent has an anchor and a hydrophobic tail. The anchor is a metal-containing complex and the hydrophobic tail is an organo-silicon material, a fluorinated hydrocarbon or both an organo-silicon material and a fluorinated hydrocarbon. The anchor is attached to at least a portion of the metal oxide. Fouling of contaminants from a fluid is inhibited onto the tubular, flow conduit or vessel by exposing the fluid to the hydrophobic tail.

In another embodiment of the disclosure, a method of inhibiting fouling of contaminants onto a metallic tubular, flow conduit or vessel within an underground reservoir or extending from or to an underground reservoir is provided. In this method, a surface modifying treatment agent is pumped into a subterranean formation. The surface modifying treatment agent has an anchor and a hydrophobic tail. The anchor of the surface modifying treatment agent attaches onto a metal oxide on the surface of the metallic tubular, flow conduit or vessel. Deposition of contaminants from a fluid onto the surface of the tubular, flow conduit or vessel is inhibited when the fluid is exposed to the hydrophobic tail of the surface modifying treatment agent.

In another embodiment, a method of inhibiting fouling resulting from contaminants onto a metallic tubular, flow conduit or vessel within an underground reservoir or extending from or to an underground reservoir is provided wherein a surface modifying treatment agent is first pumped into the underground reservoir. The surface modifying treatment agent has an anchor and a hydrophobic tail. The anchor is an organophosphorus acid derivative. The anchor of the surface modifying treatment agent is then attached onto a metal oxide on the surface of the metallic tubular, flow conduit or vessel. Deposition of contaminants from a fluid onto the surface of the tubular, flow conduit or vessel is inhibited when the fluid is exposed to the hydrophobic tail of the surface modifying treatment agent.

In another embodiment, a method of inhibiting fouling of contaminants onto a metallic tubular, flow conduit or vessel within an underground reservoir or extending from or to an underground reservoir is provided wherein a surface modifying treatment agent is first pumped into the underground reservoir. The surface modifying treatment agent has an anchor and a hydrophobic tail, wherein the anchor is a metal-containing complex and the hydrophobic tail is an organo-silicon material, a fluorinated hydrocarbon or both an organo-silicon material and a fluorinated hydrocarbon. The anchor of the surface modifying treatment agent is then attached onto a metal oxide on the surface of the metallic tubular, flow conduit or vessel. Deposition of contaminants from a fluid onto the surface of the tubular, flow conduit or vessel is inhibited when the fluid is exposed to the hydrophobic tail of the surface modifying treatment agent.

In another embodiment of the disclosure, a method of inhibiting the deposition of contaminants onto a metallic tubular, flow conduit or vessel in a well or extending from or to a well is provided. In this method, a primer is applied onto at least a portion of the metallic tubular, flow conduit or vessel. A coating is formed from the primer on at least a portion of the surface of the metallic tubular, flow conduit or vessel. A surface modifying treatment agent is then applied onto the coating. The surface modifying treatment agent has an anchor and a hydrophobic tail. The coating has a reactive site for the anchor. The anchor of the surface modifying treatment agent bonds onto at least a portion of the reactive site. Deposition of contaminants from a fluid onto the surface of the tubular, flow conduit or vessel is inhibited when the fluid is exposed to the hydrophobic tail of the surface modifying treatment agent.

In another embodiment, a method of inhibiting the deposition of contaminants onto a metallic tubular, flow conduit or vessel in a well or extending from or to a well is disclosed wherein a primer is first applied onto the metallic tubular, flow conduit or vessel to form a coating on a least a portion of the surface of the metallic tubular, flow conduit or vessel. A surface modifying treatment agent having an anchor and a hydrophobic tail is then applied to the coating. The anchor is an organophosphorus derivative. The anchor of the surface modifying treatment agent bonds to a reactive site on the coating. Deposition of contaminants from a fluid onto the surface of the tubular, flow conduit or vessel is inhibited when the fluid is exposed to the hydrophobic tail of the surface modifying treatment agent.

In another embodiment, a method of inhibiting the deposition of contaminants onto a metallic tubular, flow conduit or vessel in a well or extending from or to a well is disclosed wherein a primer is first applied onto the metallic tubular, flow conduit or vessel to form a coating on a least a portion of the surface of the metallic tubular, flow conduit or vessel. A surface modifying treatment agent having an anchor and a hydrophobic tail is then applied to the coating. The anchor has a metal and the hydrophobic tail is an organo-silicon material, a fluorinated hydrocarbon or both an organo-silicon material and a fluorinated hydrocarbon. The anchor of the surface modifying treatment agent attaches to a reactive site on the coating. Deposition of contaminants from a fluid onto the surface of the tubular, flow conduit or vessel is inhibited when the fluid is exposed to the hydrophobic tail of the surface modifying treatment agent.

In another embodiment of the disclosure, a method of inhibiting the deposition of scales, rust, paraffin, asphaltenes, salts, bacteria or mixtures thereof onto a metallic tubular, flow conduit or vessel in a well or extending from or to a well is provided. The tubular, flow conduit or vessel is composed of alloy steel or carbon steel. In this embodiment, the alloy steel or carbon steel is treated with a primer to impart reactive functional groups onto the surface. A well fluid is then pumped into the well. The fluid has a surface modifying treatment agent. The surface modifying treatment agent has an anchor and a hydrophobic tail. The anchor binds to a reactive functional group on the alloy steel or carbon steel. The hydrophobic tail is not directly attached to the alloy steel or carbon steel. Deposition of contaminants from a fluid onto the surface of the tubular, flow conduit or vessel is inhibited when the fluid is exposed to the hydrophobic tail of the surface modifying treatment agent.

In another embodiment of the disclosure, a method of inhibiting the deposition of scales, rust, paraffin, asphaltenes, salts, bacteria or mixtures thereof onto a metallic tubular, flow conduit or vessel in a well or extending from or to a well is provided. The tubular, flow conduit or vessel is composed of alloy steel or carbon steel. The alloy steel or carbon steel is treated with a primer to impart reactive functional groups onto the surface of the metallic tubular, flow conduit or vessel. A fluid comprising a surface modifying treatment agent is then pumped into the well. The surface modifying treatment agent has an anchor and a hydrophobic tail. The anchor of the surface modifying treatment agent is an organophosphorus acid derivative. The organophosphorus derivative binds to a reactive functional group on the alloy steel or carbon steel. The hydrophobic tail is not directly attached to the alloy steel or carbon steel. Deposition of contaminants from a fluid onto the surface of the tubular, flow conduit or vessel is inhibited when the fluid is exposed to the hydrophobic tail of the surface modifying treatment agent.

In another embodiment of the disclosure, a method of inhibiting the deposition of scales, rust, paraffin, asphaltenes, salts, bacteria or mixtures thereof onto a metallic tubular, flow conduit or vessel in a well or extending from or to a well is provided. The tubular, flow conduit or vessel is composed of alloy steel or carbon steel. The alloy steel or carbon steel is treated with a primer to impart reactive functional groups onto the surface of the metallic tubular, flow conduit or vessel. A fluid comprising a surface modifying treatment agent is then pumped into the well. The surface modifying treatment agent has an anchor and a hydrophobic tail. The anchor contains a metal and the hydrophobic tail is an organo-silicon material, a fluorinated hydrocarbon or both an organo-silicon material and a fluorinated hydrocarbon. The anchor binds to a reactive functional group on the alloy steel or carbon steel. The hydrophobic tail is not directly attached to the alloy steel or carbon steel. Deposition of contaminants from a fluid onto the surface of the tubular, flow conduit or vessel is inhibited when the fluid is exposed to the hydrophobic tail of the surface modifying treatment agent.

In another embodiment, a method of inhibiting the deposition of scales, rust, paraffin, asphaltenes, salts, bacteria or mixtures thereof onto a metallic tubular, flow conduit or vessel during the production of oil or gas from a well is provided. A surface modifying treatment agent having an anchor and a fluorine containing hydrophobic tail is then applied onto at least a portion of the coating. The anchor attaches to metal oxide on the surface of the metallic tubular, flow conduit or vessel. Fluids within the well are exposed to the hydrophobic tail which is not directly attached to the metallic tubular, flow conduit or vessel. Contaminants are thereby prevented from being deposited from the fluid onto the surface of the metallic tubular, flow conduit or vessel.

In another embodiment of the disclosure, a method of inhibiting the deposition of scales, rust, paraffin, asphaltenes, salts, bacteria or mixtures thereof onto the surface of a metallic tubular, flow conduit or vessel during the production of oil or gas from a well is provided. In this method, a surface modifying treatment agent is applied onto the surface of the metallic tubular, flow conduit or vessel. The surface modifying treatment agent has an anchor and a hydrophobic tail. The anchor is a metal and the hydrophobic tail is an organo-silicon material, a fluorinated hydrocarbon or both an organo-silicon material and a fluorinated hydrocarbon. The anchor attaches to the metal oxide on the surface of the metallic tubular, flow conduit or vessel. Scales, rust, paraffin, asphaltenes, salts and bacteria within the well are inhibited from being deposited on the surface of the metallic tubular, flow conduit or vessel when exposed to the hydrophobic tail.

In another embodiment, a method of inhibiting the deposition of scales, rust, paraffin, asphaltenes, salts, bacteria or mixtures thereof onto the surface of a metallic tubular, flow conduit or vessel during the production of oil or gas from a well is provided. In this method, a surface modifying treatment agent is applied onto the surface of the metallic tubular, flow conduit or vessel. The surface modifying treatment agent has an anchor and a fluorine containing hydrophobic tail. The anchor is an organophosphorus acid derivative. The hydrophobic tail is not directly bond to the surface of the metallic tubular, fluid conduit or vessel. The organophosphorus derivative attaches to metal oxide on the surface of the metallic tubular, flow conduit or vessel. Scales, rust, paraffin, asphaltenes, salts and bacteria within the well from are inhibited from being deposited on the surface of the metallic tubular, flow conduit or vessel when exposed to the hydrophobic tail.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims.

Many changes may be made to the particular embodiments and details disclosed herein without departing from such spirit and scope.

Certain terms are used herein and in the appended claims may refer to particular components, process steps or well treatment operations. As one skilled in the art will appreciate, different persons may refer to a component, a process step or a well treatment operation by different names. This document does not intend to distinguish between components, process steps or well treatment operations that differ in name but not function or operation. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation.

In an embodiment, the disclosure relates to a method of using a surface modifying treatment agent to inhibit deposition or accumulation of contaminants onto a metallic surface of a tubular, flow conduit or vessel located within an underground reservoir or extending from or to an underground reservoir. The flow conduit may be a surface pipeline or flow line. The method may be used to inhibit the deposition or accumulation of vessels located on the fly. The method may further be used to inhibit the deposition or accumulation of contaminants onto flow conduits and vessels used in refineries and fluid processing facilities.

The underground reservoir referred to herein may be a hydrocarbon producing well or a non-hydrocarbon producing well. For instance, the underground reservoir may be a gas producing well, an oil producing well, a geothermal well, a coal bed methane well or a water injection well.

The surface modifying treatment agent may be applied onto the metallic surface of the tubular, flow conduit or vessel prior to entry of the tubular, flow conduit or vessel into an underground reservoir, though typically the surface modifying treatment agent is pumped into the reservoir after placement of the tubular, flow conduit or vessel within the reservoir.

The surface of the tubular, flow conduit or vessel is typically composed of metals such as carbon steel or high alloy steels including chrome steels, duplex steels, stainless steels, martensitic alloy steels, ferritic alloy steels, austenitic stainless steels, precipitation-hardened stainless steels or high nickel content steels.

The surface modifying treatment agent comprises an anchor and a hydrophobic tail. The anchor serves to bond the hydrophobic tail onto a reactive group on the metallic substrate. In a preferred embodiment, the hydrophobic tail is not directly bond, attached or secured to the metallic substrate or to the reactive group on the metallic substrate. The hydrophobic tail of the surface modifying treatment agent is only indirectly attached to the substrate through the anchor. The hydrophobic tail is typically directed away from the metallic surface. The hydrophobic tail is believed to facilitate the movement of aqueous fluids within the reservoir away from the metallic surface of the tubular, flow conduit or vessel. This may be attributable to the modification in wettability imparted to the metallic surface by the hydrophobic tail.

The thickness of the surface modifying treatment agent on the metallic tubular, flow conduit or vessel is typically between from about 2 to about 40 nanometers. While not being bound by any particular theory, it is believed that a covalent bond is formed between the solid particulate (such as the metal of the oxide on the tubular, conduit or vessel) and the anchor of the surface modifying treatment agent.

The surface modifying treatment agent, when attached onto the tubular, conduit or vessel through the metal oxide is highly stable. Inhibition of fouling due to contaminants onto the metal surface persists throughout the extended lifetime of the bond surface modifying treatment agent.

The hydrophobic tail of the surface modifying treatment agent repels aqueous fluid within the reservoir away from the metallic substrate of the tubular, flow conduit or vessel. Direct contact time between the aqueous fluid containing contaminants and the metallic substrate of the tubular, flow conduit or vessel is decreased.

While the tail of the surface modifying treatment agent exhibits hydrophobic characteristics, it may also exhibit oleophobic properties. The surface modifying treatment agent may therefore be considered to be omniphobic.

The surface modifying treatment agent may also be used to passively inhibit, control, or prevent deposition or accumulation of scales, rust, paraffin, asphaltenes, salt or bacteria (aerobic and anaerobic) and other microbials onto the metallic substrate. (As used herein the term "inhibition" or "inhibit" shall include controlling or preventing the deposition or accumulation of contaminants onto metallic substrates.) Such inhibition may be attributable to the hydrophobic tail of the surface modifying treatment agent which minimizes or decreases the ability of contaminants to adhere to the metallic substrate of the tubular, flow conduits or vessel within the reservoir.

Further, the inhibition in scale deposition may be attributable to the hydrophobic nature of such minerals like calcium, barium, magnesium salts and the like including barium sulfate, calcium sulfate, and calcium carbonate as well as metal sulfides like zinc sulfide, iron sulfide, etc.

The bulky nature of the hydrophobic tail of the composites further may assist, prevent or control deposition of organic particulates onto the metallic substrate.

Corrosive effects of metal, especially iron and ferrous base metals, may be inhibited or prevented in light of the hydrophobicity of the surface modifying treatment agent when adhered to the metallic substrate.

The surface modifying treatment agent may further serve a passive anti-microbial function in order to counter bacterial growth principally caused by nitrogen and/or phosphorus in formation water or within fluid injected into the formation. The hydrophobic tail of the surface modifying treatment may repel the fluid from the metal surface and thus decreases contact time of the fluid onto the metallic surface. This prevents the build-up of aerobic bacteria, anaerobic bacteria and other microbials.

In a preferred embodiment, the anchor of the surface modifying treatment agent may be an organophosphorus acid derivative with the hydrophobic group attached to the anchor. In another preferred embodiment, the anchor of the surface modifying treatment agent may be a metal and the hydrophobic tail may be an organo-silicon material, a fluorinated hydrocarbon or both an organo-silicon material and a fluorinated hydrocarbon.

Organophosphorus as Anchor

The organophosphorus acid derivative comprising the anchor of the surface modifying treatment agent may originate from an organophosphoric acid, organophosphonic acid or organophosphinic acid. The organo groups of the anchor may be monomeric or polymeric.

Examples of monomeric phosphoric acid derivatives are compounds or mixtures of compounds having the structure $(RO)_x$—$P(O)$—$(OR')_y$ wherein x is 1-2, y is 1-2 and x+y=3; R preferably is a radical having a total of 1-30, preferably 2-20, more preferably 6-18 carbons; R' is H, a metal such as an alkali metal, for example, sodium or potassium or lower alkyl having 1 to 4 carbons, such as methyl or ethyl. Preferably, a portion of R' is H. The organic component of the phosphoric acid (R) can be a saturated or unsaturated aliphatic group or can be an aryl or aryl-substituted moiety. At least one of the organo groups can contain terminal or omega functional groups as described below.

Examples of monomeric phosphonic acid derivatives include compounds or mixtures of compounds having the formula:

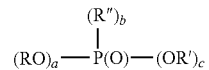

wherein a is 0-1, b is 1, c is 1-2 and a+b+c is 3; R and R" preferably are each independently a radical having a total of 1-30, preferably 2-20, more preferably 6-18 carbons; R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be a saturated or unsaturated aliphatic group or an aryl or aryl-substituted moiety. At least one of the organo groups can contain terminal or omega functional groups as described below.

Examples of monomeric phosphinic acid derivatives are compounds or mixtures of compounds having the formula:

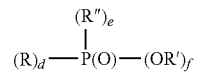

wherein d is 0-2, e is 0-2, f is 1 and d+e+f is 3; R and R" preferably are each independently radicals having a total of 1-30, preferably 2-20 carbons atoms, more preferably 6-18 carbons; R' is H, a metal, such as an alkali metal, for example, sodium or potassium or lower alkyl having 1-4 carbons, such as methyl or ethyl. Preferably a portion of R' is H. The organic component of the phosphinic acid (R, R") can be a saturated or unsaturated aliphatic group or be an aryl or aryl-substituted moiety. Examples of organo groups which may comprise R and R" include long and short chain aliphatic hydrocarbons, aromatic hydrocarbons and substituted aliphatic hydrocarbons and substituted aromatic hydrocarbons.

At least one of the organo groups can further contain one or more terminal or omega functional groups which are hydrophobic. Examples of terminal or omega functional groups include carboxyl such as carboxylic acid, hydroxyl, amino, imino, amido, thio and phosphonic acid, cyano, sulfonate, carbonate and mixed substituents.

Representative of organophosphorus acid derivatives are amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, styrene phosphonic acid, and dodecyl bis-1,12-phosphonic acid.

In addition to monomeric organophosphorus acid derivatives, oligomeric or polymeric organophosphorus acid derivatives resulting from self-condensation of the respective monomeric acids may be used.

The hydrophobic tail of the surface modifying treatment agent may be a fluorine containing moiety. In an embodiment, the fluorine containing moiety is $R_f-(CH_2)_p-$ where $R_f$ is a perfluorinated alkyl group or contains a perfluorinated alkylene ether group and p is 2 to 4, preferably 2.

Typically, the fluorine containing moiety has a number average molecular weight of less than 2000.

Examples of perfluorinated groups for the fluorine containing moiety are those of the structure:

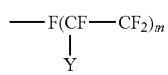

where Y is F or $C_nF_{2n+1}$; m is 4 to 20 and n is 1 to 6.

A preferred oligomeric or perfluoroalkylene ether group is where R and/or R" is a group of the structure:

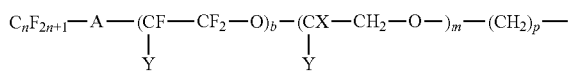

where A is an oxygen radical or a chemical bond such as $CF_2$; n is 1 to 20, preferably 1 to 6; Y is H, F, $C_nH_{2n+1}$ or $C_nF_{2n+1}$; b is at least 1, preferably 2 to 10, m is 0 to 50, and p is 1 to 20.

In a preferred embodiment, the surface modifying treatment agent is of the formula $R_f-(CH_2)_p-Z$ where Z, the attachment site is H, F or an acid derivative, and the hydrophobic tail (bonded to the attachment site) is the $R_f-(CH_2)_p-$ moiety where $R_f$ is a perfluorinated alkyl group or contains a perfluorinated alkylene ether group referenced above and p is 2 to 4, preferably 2.

In an embodiment, the surface modifying treatment agent is of the formula $R_f-(CH_2)_p-Z$, wherein Z is:

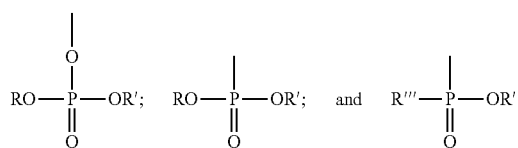

where R and R" are a hydrocarbon or substituted hydrocarbon radical having up to 200, such as 1 to 30 and 6 to 20 carbons, R and R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

In an embodiment, the surface modifying treatment agent is of the formula $CF_3(C_nF_{2n})CH_2CH_2PO_3H_2$ where n is between 3 and 5 or $CF_3(CF_2)_xO(CF_2CF_2)_y-CH_2CH_2-PO_3H_2$ where x is from 0 to 7, y is from 1 to 20 and x+y is less than or equal to 27.

While not being bound to any theory, it is believed that a covalent bond is formed between the metal of the oxide of the tubular, conduit or vessel and the anchor of the surface modifying treatment agent by breaking the P=O bond of the organophosphorus to form a M-O-P covalent bridge.

Metal as Anchor

The anchor of the surface modifying treatment agent may be a metal. For instance, the anchor may be a Group 3, 4, 5, or 6 metal. In a preferred embodiment, the metal is a Group 4 metal, such as Ti, Zr or Hf, a Group 5 metal, such as Ta or Nb, a Group 6 metal, such as W, or a metal of the lanthanide series, such as La.

The hydrophobic tail of the surface modifying treatment agent may be an organo-silicon material, a fluorinated hydrocarbon or both a hydrophobic organo-silicon material and a fluorinated hydrocarbon.

The surface modifying treatment agent may be represented by the formula X-M, wherein M is the metal containing organic ligand and X is the hydrophobic tail represented by the organo-silicon containing material, the fluorinated hydrocarbon or a combination of organo-silicon containing material and fluorinated hydrocarbon.

The tail of the surface modifying treatment agent may be aligned such that the hydrophobicity character of the treatment agent is imparted away from the anchor.

The surface modifying treatment agent may be formed by reacting a metal containing organic ligand with the organo-silicon containing material and/or fluorinated hydrocarbon group.

The metal containing organic ligand may be formed by reacting a metal compound, such as a metal halide, like $TaCl_5$, with an oxygen containing ligand. The number of oxygen containing ligands attached to the metal is typically equal to the valency of the metal atom. Thus, depending upon the position of the transition metal on the Periodic Chart, the metal containing organic ligand may have from two to six organic ligand groups.

In an embodiment, the ligand of the metal containing organic ligand contains an alkoxide or ester. Suitable organometallic derivatives include metal derivatives of $C_1$ to $C_{18}$ alkoxides, preferably alkoxides containing from 2 to 8 carbon atoms such as ethoxide, propoxide, isopropoxide, butoxide, isobutoxide and tertiary butoxide. For instance, the metal containing organic ligand may be a transition metal tetra-alkoxide, such as zirconium tetra tert-butoxide.

The alkoxides may be in the form of simple esters and polymeric forms of the alkoxylates and esters as well as various chelates and complexes. For example, with the metal Ta, the simple esters could be $Ta(OR)_5$ where R is $C_1$ to $C_{18}$ alkyl. Polymeric esters may be obtained by condensation of an alkyl ester and can have the structure $RO-[Ta(OR)_3-O-]_x-R$ where R is defined above and x is a positive integer.

Further, the alkoxide can include, for instance, when the metal is titanium or zirconium:

(a) alkoxylates having the general formula $M(OR)_4$, wherein M is selected from Ti and Zr and R is $C_{1-18}$ alkyl;

(b) polymeric alkyl titanates and zirconates obtainable by condensation of the alkoxylates of (a), i.e., partially hydrolyzed alkoxylates of the general formula $RO[-M(OR)_2O-]_{x-1}R$, wherein M and R are as above and x is a positive integer;

(c) titanium chelates, derived from ortho titanic acid and polyfunctional alcohols containing one or more additional hydroxyl, halo, keto, carboxyl or amino groups capable of donating electrons to titanium. Examples of these chelates are those having the general formula $Ti(O)_a(OH)_b(OR')_c(XY)_d$, wherein a=4-b-c-d; b=4-a-c-d; c=4-a-b-d; d=4-a-b-c; R' is H, R as above or X—Y, wherein X is an electron donating group such as oxygen or nitrogen and Y is an aliphatic radical having a two or three carbon atom chain such as:

(i) —$CH_2CH_2$—, e.g., of ethanolamine, diethanolamine and triethanolamine, or

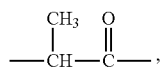

(ii) lactic acid,

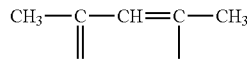

(iii) acetylacetone enol form, and

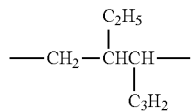

(iv) 1,3-octyleneglycol, (d) titanium acrylates having the general formula $Ti(OCOR)_{4-n}(OR)_n$, wherein R is $C_{1-18}$ alkyl as above and n is an integer of from 1 to 3, and polymeric forms thereof, or (e) mixtures thereof.

Acetyl acetonates, alkanolamines, lactates and halides, such as chloride, can also be used as the ligand of the oxygen containing organic ligand. In addition, the oxygen containing ligand can contain a mixture of ligands selected alkoxides, acetyl acetonates, alkanolamines, lactates and halides.

In an embodiment, the organo-silicon containing material may be a silane, polysiloxane or a polysilazane.

Examples of organo-silicon containing materials are those having the formula $R^1_{4-x}SiA_x$ or $(R^1_3Si)_yB$ as well as organo(poly)siloxanes and organo(poly)silazanes containing units of the formula:

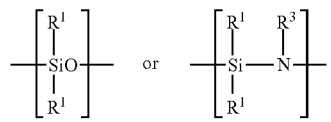

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5_2SiO_2$ where $R^5$ is a halogen such as a chloro or fluoro substituent.

In an embodiment, the organo-silicon containing compound may be an organo(poly)siloxane or organo(poly)silazane of a number average molecular weight of at least 400, usually between 1000 and 5,000,000.

The substituent A in $R^1_{4-x}SiA_x$ may be hydrogen, a halogen such as chloride, OH, $OR^2$ or

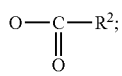

wherein B in the above structural formula may be $NR^3_{3-y}$, $R^2$ a hydrocarbon or substituted hydrocarbon radical containing from 1 to 12, typically 1 to 4 carbon atoms. $R^3$ is hydrogen or has the same meaning as $R^1$, x is 1, 2 or 3, y is 1 or 2.

Preferably, $R^1$ is a fluoro-substituted hydrocarbon. Preferred are such fluoro-substituted hydrocarbons are those of the structure:

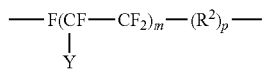

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

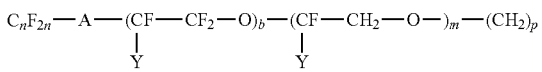

where A is an oxygen radical or a chemical bond; n is 1 to 6, y is F or $C_nF_{2n}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like $Ta(EtO)_4acac$:PFOSi; tantalum alkoxy-alkylsilylhalide; tantalum halide-polyalkylsiloxane, like $TaCl_5$:PDMS; niobium alkoxide-perfluoroalkoxysiloxane, such as $Nb(EtO)_5$:PFOSi and $Ta(EtO)_5$:PFOSi; titanium alkoxide-perfluoroalkoxysiloxane, like $Ti(n-BuO)_4$:PFOSi; zirconium alkoxide-perfluoroalkoxysiloxane; lanthanum alkoxide-perfluoroalkoxysilane, like $La(iPrO)_3$:PFOSi; tungsten chloride-perfluoroalkoxysiloxane, like $WCl_6$:PFOSi; tantalum alkoxide-polyalkylsiloxane, like $Ta(EtO)_5$:PDMS; and tantalum alkoxyacetylacetonate-polyalkylsiloxane, like $Ta(EtO)_4acac$:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as a is carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—$(CFY$—$CF_2)_m$ where Y is F or $C_nF_{2n+1}$; m is 4 to 20 and n is 1 to 6.

Examples of perfluoroalkylene ether groups are those of the structure:

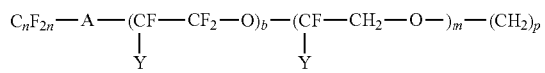

where A is an oxygen radical or a chemical bond; n is 1 to 6, Y is F or $C_nF_{2n}$; b is 2 to 20, m is 0 to 6, and p is 0 to 18, preferably 2 to 4 and more preferably 2.

Preferred fluorinated materials are esters of perfluorinated alcohols such as the alcohols of the structure F—$(CFY$—$CF_2)_m$—$CH_2$—$CH_2$—OH where Y is F or $C_nF_{2n+1}$; m is 4 to 20 and n is 1 to 6.

Further preferred as fluorinated hydrocarbons are perfluorinated hydrocarbons of the structure $R_f$—$(CH_2)_p$—X where $R_f$ is a perfluoroalkylene ether group or a perfluoroalkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

Further preferred as fluorinated hydrocarbons are perfluorinated hydrocarbons of the structure $R_f$—$(CH_2)_p$—Z where $R_f$ and p are as defined above, preferably $R_f$ is a perfluoroalkylene ether group such as those described above, and p is from 2 to 4, and Z is a phosphorus acid group. Examples of phosphorus acid groups are:

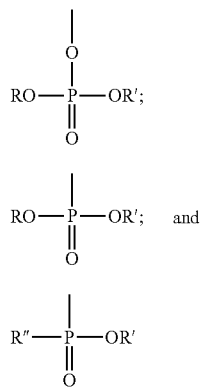

where R" is a hydrocarbon or substituted hydrocarbon radical having up to 200, such as 1 to 30 and 6 to 20 carbons, R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Preferably, the phosphorus acid is of formula II where R and R' are H.

Suitable methods for preparing the surface modifying treatment agents wherein the organo portion of the metal containing organic ligand is reactive with the organo-silicon containing material or fluorinated hydrocarbon group are disclosed in U.S. Pat. Nos. 7,879,437 and 8,067,103. In one embodiment, for instance, the organo portion of the organometallic compound may be selected from those groups that may be reactive with the acids (or their derivatives) of a perfluoroalkylene ether.

As an example, the surface modifying treatment agent could be prepared by mixing the metal containing organic ligand and the silicon-containing material or fluorinated hydrocarbon in a closed system to avoid hydrolysis of the reactants. Reaction can occur neat or in the presence of a non-reactive solvent such as chlorinated or fluorinated solvent, for example, methylene chloride. Heat may be used to initiate and complete the reaction. Solvent may be removed by evaporation and the reaction product can be redissolved in a suitable solvent such as an alcohol, for example, ethanol or propanol, for application to the substrate. The mole ratio of the organosilicon-containing material to the metal containing organic ligand is typically from 100:1 to 1:100, preferably from 1:1 to 10:1 depending on the valence of the metal of the metal containing organic ligand. For example, the molar ratio of organosilicon compound to Ta(V) is typically 5 to 1.

In an embodiment, the surface modifying treatment agent may be represented by the formula $X_a(OR)_bM$, wherein OR is a $C_1$ to $C_{18}$ alkoxide, X is the hydrophobic tail represented by the organo-silicon material or the fluorinated hydrocarbon, M is metal of the metal containing organic ligand and a+b equals the valency of M and further wherein neither a nor b are zero.

In an exemplary embodiment, the surface modifying agent may be formed by reacting an organosilicon compound such as an organosilane or a polysiloxane with a metal containing organic ligand, such as a derivatized alkoxide. The metal of the metal containing organic ligand is covalently bonded to the organosilicon compound to form the anchor and the hydrophobic tail.

The attachment site of the anchor of the surface modifying treatment agent onto the metallic substrate is typically a reactive functional group. The reactive group on the metallic substrate typically is a metal oxide.

The metal oxide may also be applied onto the metallic surface of the tubular, flow conduit or vessel by application of a primer. The primer when coated onto the substrate may contain a metal oxide or may form a metal oxide upon contact. While it is possible to mix the primer with the surface modifying treatment agent and apply the mixture to the substrate at the same time, it is more preferred to apply the primer first and then, after reactive functional groups have been formed, apply the surface modifying treatment agent.

The primer may be applied to the metallic substrate by conventional means such as immersion coating such as dipping, rolling, or spraying to form the coating. The diluent is permitted to evaporate. This can be accomplished by heating to 50-200° C.

In a preferred embodiment, a fluid containing an organometallic material may be used to impart reactive functional groups to the metallic substrate. Such functional groups may be reactive with the anchor of the surface modifying treatment agent.

Such organometallic compounds include those derived from a transition metal, such as a Group IIIB metal or a transition metal selected from Group IVB, VB and VIB. Preferred transition metals are titanium, zirconium, lanthanum, hathium, tantalum and tungsten.

The organo portion of the organometallic may contain an alkoxide and/or halides. Examples of suitable alkoxide groups are those containing from 1 to 18 carbon atoms, preferably 2 to 8 carbon atoms, such as ethoxide, propoxide, isopropoxide, butoxide, isobutoxide and tertiary butoxide. Examples of suitable halides are fluoride and chloride. Other ligands which may also be present are acetyl acetonates.

Suitable organometallic compounds may be esters and polymeric forms of the esters including:
  i. alkoxylates of titanium and zirconium having the general formula $M(OR)_4$, wherein M is selected from Ti and Zr and R is $C_{1-18}$ alkyl;
  ii. alkyl esters of titanium and zirconium having the general formula $(X)_{4-y}$-$M(OR)_y$, wherein M is selected from Ti and Zr; X is selected from fluorine and chlorine; R is $C_{1-18}$ alkyl and y=2 to 3;
  iii. polymeric alkyl titanates and zirconates obtainable by condensation of the alkyl esters of (a), i.e., partially hydrolyzed alkyl esters of the general formula $RO[-M(OR)(X)O—]_yR$, wherein M, R and X are as above and y is a positive integer;
  iv. titanium chelates, derived from ortho titanic acid and polyfunctional alcohols containing one or more additional hydroxyl, halo, keto, carboxyl or amino groups capable of donating electrons to titanium. Examples of these chelates are those having the general formula $Ti(O)_a(OH)_b(OR')_c(XY)_d$, wherein a=4-b-c-d; b=4-a-c-d; c=4-a-b-d; d=4-a-b-c; R' is H, R as above or X—Y, wherein X is an electron donating group such as oxygen or nitrogen and Y is an aliphatic radical having a two or three carbon atom chain such as:
    (a) —$CH_2CH_2$—, e.g., of ethanolamine, diethanolamine and triethanolamine, or

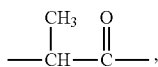

(b) lactic acid,

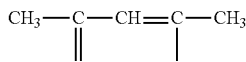

(c) acetylacetone enol form, and

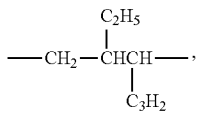

(d) 1,3-octyleneglycol,
  v. titanium acrylates having the general formula $Ti(OCOR)_{4-n}(OR)_n$ wherein R is $C_{1-18}$ alkyl as above and n is an integer of from 1 to 3, and polymeric forms thereof, or
  vi. mixtures of (a) and (b).

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound may be applied to the solid particulate by vapor deposition techniques.

The concentration of the organometallic compound in the composition is not particularly critical but is usually at least 0.001 millimolar, typically from 0.01 to 100 millimolar, and more typically from 0.1 to 50 millimolar.

In addition, a metal oxide may be deposited onto the metallic surface from precipitation of oxides from a solution.

Further, the metal oxide may form on the metallic surface such as through corrosion or such environmental factors as air or water. Further, the metal oxide may be deposited onto the metallic surface by precipitation or formation of scales, rust, paraffin, asphaltenes or salts within the reservoir. Application of the surface modifying treatment agent onto the metallic surface of the tubular, flow conduit or vessel inhibits further precipitation or formation of such deposits.

The surface modifying treatment agent may be dissolved or dispersed in a diluent to form a solution. The solution may then be applied onto the metallic substrate. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds such as perfluorinated tetrahydrofuran. Also, aqueous alkaline solutions such as sodium and potassium hydroxide can be used as the diluent.

The concentration of the surface modifying treatment agent in a fluid pumped into the reservoir is typically between from about 0.01% to 100% or more typically between from about 0.1% to about 20% (v/v).

The surface modifying treatment agent may also be pumped into the reservoir as a component of a fluid. Thus, for instance, the surface modifying treatment agent may be pumped into the reservoir as a component of a fracturing fluid, pad fluid, acidizing fluid, etc.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

What is claimed is:
1. A method of inhibiting fouling caused by contaminants onto a metallic tubular, flow conduit or vessel in an underground reservoir or extending from or to an underground reservoir, the method comprising:
  (a) introducing onto a metal oxide on the metallic tubular, flow conduit or vessel a surface modifying treatment agent comprising an anchor and a hydrophobic tail;
  (b) attaching the anchor onto at least a portion of the metal oxide; and
  (a) inhibiting fouling from a fluid onto the tubular, flow conduit or vessel by exposing the fluid to the hydrophobic tail.

2. The method of claim 1, wherein either (a) the anchor is a metal and the hydrophobic tail is an organo-silicon material, a fluorinated hydrocarbon or both an organo-silicon material and a fluorinated hydrocarbon; or (b) the anchor is an organophosphorus acid derivative and the hydrophobic group is attached thereto.

3. The method of claim 2, wherein the anchor is a metal and the hydrophobic tail is an organo-silicon material, a fluorinated hydrocarbon or both an organo-silicon material and a fluorinated hydrocarbon.

4. The method of claim 2, wherein the anchor is an organophosphorus acid derivative and the hydrophobic tail is directed away from the metal oxide.

5. The method of claim 1, wherein the flow conduit is a surface pipeline or flow line.

6. The method of claim 1, wherein the anchor of the surface modifying treatment agent is bound to the metal oxide on the metallic tubular, flow conduit or vessel prior to introducing the metallic tubular, flow conduit or vessel into the underground reservoir.

7. The method of claim 1, wherein the anchor of the surface modifying treatment agent is bound to the metal oxide on the metallic tubular, flow conduit or vessel in-situ within the underground reservoir.

8. The method of claim 4, wherein the anchor of the surface modifying treatment agent originates from an organophosphoric acid, organophosphonic acid or an organophosphinic acid.

9. The method of claim 8, wherein the organophosphorus acid derivative is at least one member selected from the group consisting of:
  (a) a derivative of a phosphoric acid having the structure $(RO)_x$—$P(O)$—$(OR')_y$;
  (b) a derivative of a phosphonic acid of the structure:

$$(RO)_a\text{---}\underset{\underset{(R'')_b}{|}}{P(O)}\text{---}(OR')_c;$$

and
  (c) a derivative of a phosphinic acid of the structure:

$$(R)_d\text{---}\underset{\underset{(R'')_e}{|}}{P(O)}\text{---}(OR')_f$$

wherein:
  R and R" are each independently a radical having a total of 1 to 30 carbon atoms; R' is H, a metal or a lower alkyl having from 1 to 4 carbon atoms;
  x is 1 to 2; y is 1 to 2; x+y=3;
  a is 0-1;
  b is 1;
  c is 1-2;
  a+b+c is 3;
  d is 0-2;
  e is 0-2;
  f is 1; and
  d+e+f is 3.

10. The method of claim 2, wherein the surface modifying treatment agent is of the formula:

$$R_f\text{---}(CH_2)_p\text{---}Z$$

wherein:
  $R_f$ is a perfluorinated alkyl group or a perfluorinated alkylene ether group;
  p is 2 to 4; and
  Z is selected from the group consisting of:

$$RO\text{---}\underset{\underset{O}{\|}}{\overset{\overset{O}{|}}{P}}\text{---}OR';$$

$$RO\text{---}\underset{\underset{O}{\|}}{\overset{\overset{O}{|}}{P}}\text{---}OR'; \quad \text{and}$$

$$R''\text{---}\underset{\underset{O}{\|}}{\overset{\overset{O}{|}}{P}}\text{---}OR'$$

wherein R and R" are a hydrocarbon or substituted hydrocarbon radical having up to 200 carbon atom or a perfluoroalkyl group, and R' is H, a metal, an amine or an aliphatic or aryl radical aryl.

11. The method of claim 10, wherein R" is aliphatic or aromatic substituent substituted with a perfluorinated alkyl group or a perfluorinated alkylene ether group.

12. The method of claim 10, wherein the perfluoroalkylene ether group of $R_f$ is of the structure:

$$C_nF_{2n+1}\text{---}A\text{---}(CF\underset{\underset{Y}{|}}{\text{---}}CF_2\text{---}O)_b\text{---}(CX\underset{\underset{Y}{|}}{\text{---}}CH_2\text{---}O\text{---})_m(CH_2)_p\text{---}$$

where A is an oxygen radical or a chemical bond; n is 1 to 20; Y is H, F, $C_nH_{2n+1}$ or $C_nF_{2n+1}$; b is at least 1; m is 0 to 50; p is 1 to 20; and X is H, F or an acid group or an acid derivative.

13. The method of claim 10, wherein the perfluorinated alkyl group is of the structure:

$$\text{---}F(CF\underset{\underset{Y}{|}}{\text{---}}CF_2)_m$$

where Y is F or $C_nF_{2n+1}$ and m is 4 to 20.

14. The method of claim 4, wherein the surface modifying treatment agent is selected from the group consisting of $CF_3(C_nF_{2n})CH_2CH_2PO_3H_2$ where n is between 3 and 5, and $CF_3(CF_2)_xO(CF_2CF_2)_y$—$CH_2CH_2$—$P_3H_2$ where x is from 0 to 7, y is from 1 to 20 and x+y is less than or equal to 27.

15. The method of claim 10, wherein R or R' contains a terminal or omega functional groups.

16. The method of claim 15, wherein the terminal or omega functional group is selected from the group consisting of carboxyl, hydroxyl, amino, imino, amido, thio, cyano, sulfonate, carbonate, phosphonic acid or a mixture thereof.

17. The method of claim 8, wherein the organophosphoric acid, organophosphonic acid or organophosphinic acid is selected from the group consisting of amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, and dodecyl bis-1,12-phosphonic acid.

18. The method of 3, wherein the metal of the anchor is a Group 3, 4, 5, or 6 metal.

19. The method of claim 18, wherein the metal of the surface modifying treatment agent is selected from the group consisting of Ti, Zr, La, Hf, Ta, W and Nb.

20. The method of claim 3, wherein the hydrophobic organo-silicon material has a formula selected from:

$$R^1_{4-x}SiA_x \text{ and } (R^1_3Si)_yB$$

or an organo(poly)siloxane or organo(poly)silazane of the formula:

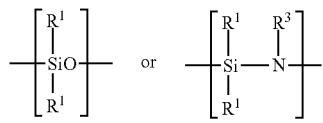

where:
R$^1$ are identical or different and are a hydrocarbon or substituted hydrocarbon radical containing from 1 to 100 carbon atoms;
A is hydrogen, halogen, OH, OR$^2$ or

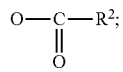

B is NR$^3_{3-y}$;
R$^2$ is a hydrocarbon or substituted hydrocarbon radical containing from 1 to 12 carbon atoms;
R$^3$ is hydrogen or R$^1$;
x is 1, 2 or 3; and
y is 1 or 2.

21. The method of claim 3, wherein the hydrophobic organo-silicon material is of the formula $$R^1_{4-x}SiA_x$$

wherein R$^1$ is a fluoro-substituted hydrocarbon and A is OR$^2$.

22. The method of claim 3, wherein the fluorinated hydrocarbon is of the structure:

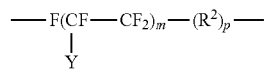

where Y is F or C$_n$F$_{2n+1}$; m is 4 to 20 and n is 1 to 6; R$^2$ is alkyl containing from 1 to 4 carbon atoms and p is 0 to 18.

23. The method of claim 20, wherein R$^1$ is of the structure:

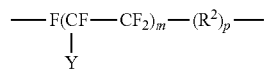

where Y is F or C$_n$F$_{2n+1}$; m is 4 to 20 and n is 1 to 6; R$^2$ is alkyl containing from 1 to 4 carbon atoms and p is 0 to 18.

24. The method of claim 3, wherein the fluorinated hydrocarbon is of the structure:

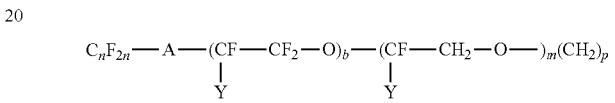

where A is an oxygen radical or a chemical bond; n is 1 to 6, y is F or C$_n$F$_{2n}$; b is at least 1; m is 0 to 6 and p is 0 to 18.

25. The method of claim 3, wherein the hydrophobic organo-silicon material is an organo(poly)siloxane or an organo(poly)silazane.

26. The method of claim 25, wherein the organo(poly)siloxane or an organo(poly)silazane have units of the formula:

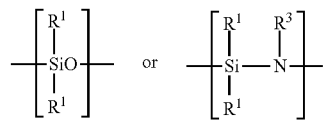

where R$^1$ are identical or different and are a hydrocarbon or substituted hydrocarbon radical containing from about 1 to about 12 carbon atoms; and R$^3$ is hydrogen or R$^1$.

27. The method of claim 3, wherein the hydrophobic organo-silicon material contains additional units of the formula: R$^5_2$SiO$_2$ where R$^5$ is halogen.

28. The method of claim 24, wherein the organo(poly)siloxane and organo(poly)silazane has a number average molecular weight of at least 400.

* * * * *

UNITED STATES PATENT AND TRADEMARK OFFICE
CERTIFICATE OF CORRECTION

PATENT NO. : 10,227,846 B2
APPLICATION NO. : 14/491951
DATED : March 12, 2019
INVENTOR(S) : Terry D. Monroe et al.

Page 1 of 1

It is certified that error appears in the above-identified patent and that said Letters Patent is hereby corrected as shown below:

In the Claims

Column 18, Line 49, Claim 14:
"$CH_2CH_2-P_3H_2$"
Should read:
-- $CH_2CH_2-PO_3H_2$ --

Signed and Sealed this
Thirtieth Day of June, 2020

Andrei Iancu
*Director of the United States Patent and Trademark Office*